United States Patent
Ting et al.

(10) Patent No.: US 8,189,153 B2
(45) Date of Patent: May 29, 2012

(54) PIXEL STRUCTURE AND DISPLAY PANEL HAVING THE SAME

(75) Inventors: Tien-Lun Ting, Taichung (TW);
Chien-Huang Liao, Hsinchu (TW);
Wen-Hao Hsu, Hsinchu County (TW);
Jenn-Jia Su, Chiayi County (TW)

(73) Assignee: Au Optronics Corporation, Hsinchu (TW)

( * ) Notice: Subject to any disclaimer, the term of this patent is extended or adjusted under 35 U.S.C. 154(b) by 211 days.

(21) Appl. No.: 12/725,448

(22) Filed: Mar. 16, 2010

(65) Prior Publication Data

US 2011/0096281 A1 Apr. 28, 2011

(30) Foreign Application Priority Data

Oct. 26, 2009 (TW) .............................. 98136415 A

(51) Int. Cl.
*G02F 1/1337* (2006.01)

(52) U.S. Cl. .................................................... 349/129

(58) Field of Classification Search .................... 349/129
See application file for complete search history.

(56) References Cited

U.S. PATENT DOCUMENTS

| 6,850,302 B2 | 2/2005 | Song |
| 7,206,048 B2 | 4/2007 | Song |
| 2009/0161055 A1 * | 6/2009 | Huang et al. .................. 349/129 |

FOREIGN PATENT DOCUMENTS

CN 101504503 8/2009

OTHER PUBLICATIONS

"First Office Action of China Counterpart Application", issued on Oct. 26, 2010, p. 1-p. 4.

* cited by examiner

*Primary Examiner* — Phu Vu

(74) *Attorney, Agent, or Firm* — Jianq Chyun IP Office

(57) ABSTRACT

A pixel structure including a substrate, a scan line, a data line, an active device, a capacitor electrode and a pixel electrode is described. The substrate has a pixel region. The active device is electrically connected to the scan line and the data line. The capacitor electrode is disposed on the substrate. The pixel electrode is disposed in the pixel region and electrically connected to the active device, wherein the pixel electrode includes a first extending part, a second extending part and branches. The first extending part is disposed above the capacitor electrode and electrically coupling with the capacitor electrode, wherein the capacitor electrode is not completely covered by the first extending part. The second extending part has an extending direction different from that of the first extending part. The branches extend from the first extending part and the second extending part to an edge of the pixel region.

19 Claims, 15 Drawing Sheets

PIXEL STRUCTURE AND DISPLAY PANEL HAVING THE SAME

CROSS-REFERENCE TO RELATED APPLICATION

This application claims the priority benefit of Taiwan application serial no. 98136415, filed on Oct. 26, 2009. The entirety of the above-mentioned patent application is hereby incorporated by reference herein and made a part of specification.

BACKGROUND OF THE INVENTION

1. Field of the Invention

The present invention relates to a pixel structure and a display panel having the same, and particularly to a pixel structure and a display panel having the same using polymer stabilized alignment (PSA) technology.

2. Description of Related Art

In the development of the display, with the progress in the optoelectronic techniques and the semiconductor manufacturing techniques, the liquid crystal display with the advantages of high definition, optimal space utilization, low power consumption, and no radiation has gradually become the main stream of the market.

A liquid crystal display includes a backlight module and a liquid crystal display panel, and a conventional liquid crystal display panel is composed by two substrates and a liquid crystal layer between the two substrates. Generally speaking, when the liquid crystal panel is manufactured, alignment films will be formed on the two substrates, such that liquid crystal molecules are aligned in a specific manner. A conventional method of forming the alignment films is coating an alignment material first, and then performing an alignment process on the alignment material. The alignment process can be classified into a contact alignment process and a non-contact alignment process. Though the non-contact alignment process solves the problems of electrostatics and particle contamination in the contact friction alignment, it often leads to the problem of insufficient anchoring energy on alignment surfaces. Insufficient anchoring energy of an alignment surface may result in bad display quality of the LCD panel.

In order to solve the above problems, a polymer stabilized alignment (PSA) technology has been developed. According to this technology, high molecular monomers of an appropriate concentration are mixed into the liquid crystal material and are vibrated to an even state. Next, the mixed liquid crystal material is heated to an isotropy state on a heater. Then, when the liquid crystal mixture is cooled to the ambient temperature of 25° C., the liquid crystal mixture returns to a nematic state. At this time, the liquid crystal mixture is filled into the liquid crystal cell, and a voltage is applied thereon. When the arrangement of the liquid crystal molecules is stabilized, the high molecular monomers are bonded to form a polymer layer by means of UV curing or heating, so as to realize the stabilized alignment.

Generally speaking, in the PSA LCD panel, alignment slits having different extending directions are formed in a pixel electrode of a pixel structure, so as to form multi-domains in the pixel structure. In addition, a capacitor electrode is also formed under the pixel electrode of the pixel structure to allow the pixel electrode electrically coupling with the capacitor electrode, and the pixel electrode usually completely covers the capacitor electrode underneath. That is, the pixel electrode has a width larger than that of the capacitor electrode. The capacitor electrode not only electrically couples with the pixel electrode to store the electrical signal of the pixel structure, but also shields a boundary region between the two adjacent domains. However, a disclination line is usually displayed at the capacitor electrode of the pixel structure of the display panel, so as to deteriorate the display quality.

SUMMARY OF THE INVENTION

The present invention is directed to a pixel structure and a display panel having the same to resolve the problem of the disclination line formed at the capacitor electrode of the conventional PSA display panel.

A pixel structure including a substrate, a scan line, a data line, an active device, a capacitor electrode and a pixel electrode is described. The substrate has a pixel region. The scan line and the data line are disposed on the substrate. The active device is electrically connected to the scan line and the data line. The capacitor electrode is disposed on the substrate. The pixel electrode is disposed in the pixel region and electrically connected to the active device, wherein the pixel electrode includes a first extending part, a second extending part and branches. The first extending part is disposed above the capacitor electrode and electrically couples with the capacitor electrode, wherein the capacitor electrode is not completely covered by the first extending part. The second extending part has an extending direction different from that of the first extending part. The branches extend from the first extending part and the second extending part to an edge of the pixel region.

A display panel including a first substrate, a second substrate, and a display medium is provided. The first substrate has a plurality of pixel structures, and each pixel structure is as above mentioned. The second substrate is disposed opposite to the first substrate. The display medium is sandwiched between the first substrate and the second substrate.

According to the aforementioned, since the pixel electrode electrically coupling with the capacitor electrode has a width smaller than that of the capacitor electrode or the pixel electrode electrically coupling with the capacitor electrode has an opening therein, the capacitor electrode is not completely covered by the pixel electrode. Therefore, the arrangement of the liquid crystal molecules on the capacitor electrode is changed, so that the disclination line generated at the capacitor electrode is avoided.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
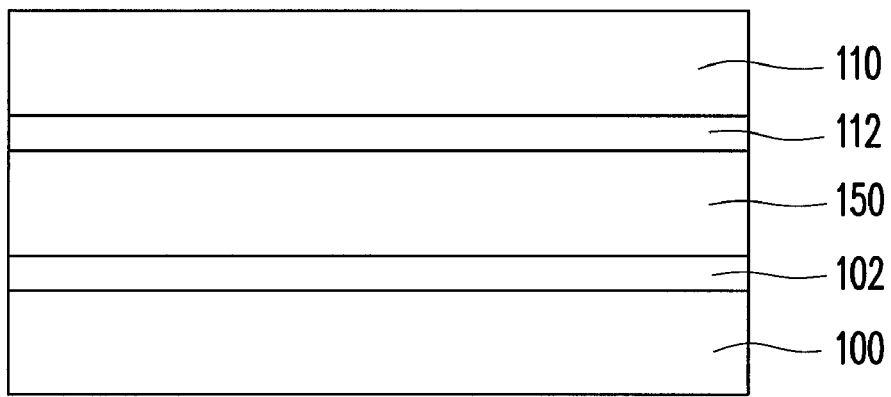
FIG. 1 is a schematic cross-sectional view of a display panel according to an embodiment of the present invention.

FIG. 1 is a schematic cross-sectional view of a display panel according to an embodiment of the present invention. Referring to FIG. 1, the display panel of the present embodiment includes a first substrate 100, a second substrate 110, and a display medium 150 between the first substrate 100 and the second substrate 110.

The first substrate 100 can be made of glass, quartz, an organic material, a metal, or the like. The first substrate 100 has a pixel array layer 102 thereon, and the pixel array layer 102 includes a plurality of pixel structures. The pixel structures of the pixel array layer 102 are described in the following paragraphs.

The second substrate 110 can be made of glass, quartz, an organic material, or the like. In an embodiment, the second substrate 110 has an electrode layer disposed thereon. The electrode layer 112 can be a transparent electrode layer and can be, for example, made of indium tin oxide (ITO) or indium zinc oxide (IZO). The electrode layer 112 completely covers the second substrate 110. In addition, according to another embodiment, a color filter array (not shown), which comprises red, green and blue filter patterns, can also be disposed on the second substrate 110. Moreover, a light shielding pattern layer (not shown) may also be disposed on the second substrate 110 and disposed between the patterns of the color filter array, and it is also called a black matrix.

The display medium 150 comprises liquid crystal molecules. Because the display panel of the embodiment is a PSA display panel, the display medium 150 comprises the liquid crystal molecules and monomers. In other words, before a curing process is performed to the monomers in the display panel, the display medium 150 comprises the liquid crystal molecules and the monomers. When the curing process is performed to the monomers in the display panel, the monomers are polymerized to form a thin film on the surfaces of the pixel array layer 102 and the electrode layer 112. Therefore, after the curing process for the monomers in the display panel, the display medium 150 is mainly comprised of the liquid crystal molecules.

Figure 2A:
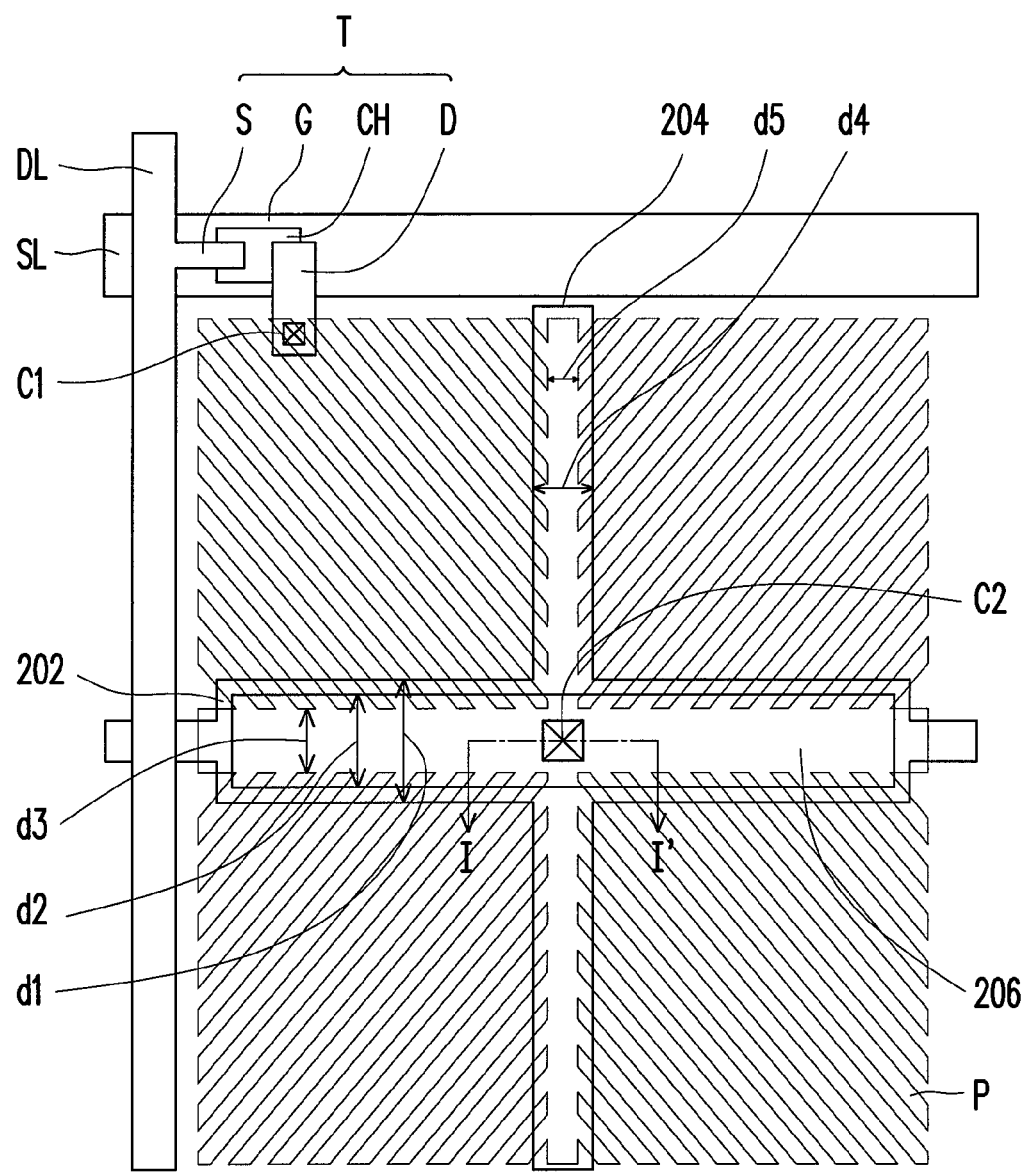
FIG. 2A is a schematic top view of a pixel structure according to an embodiment of the present invention.
Figure 2B:
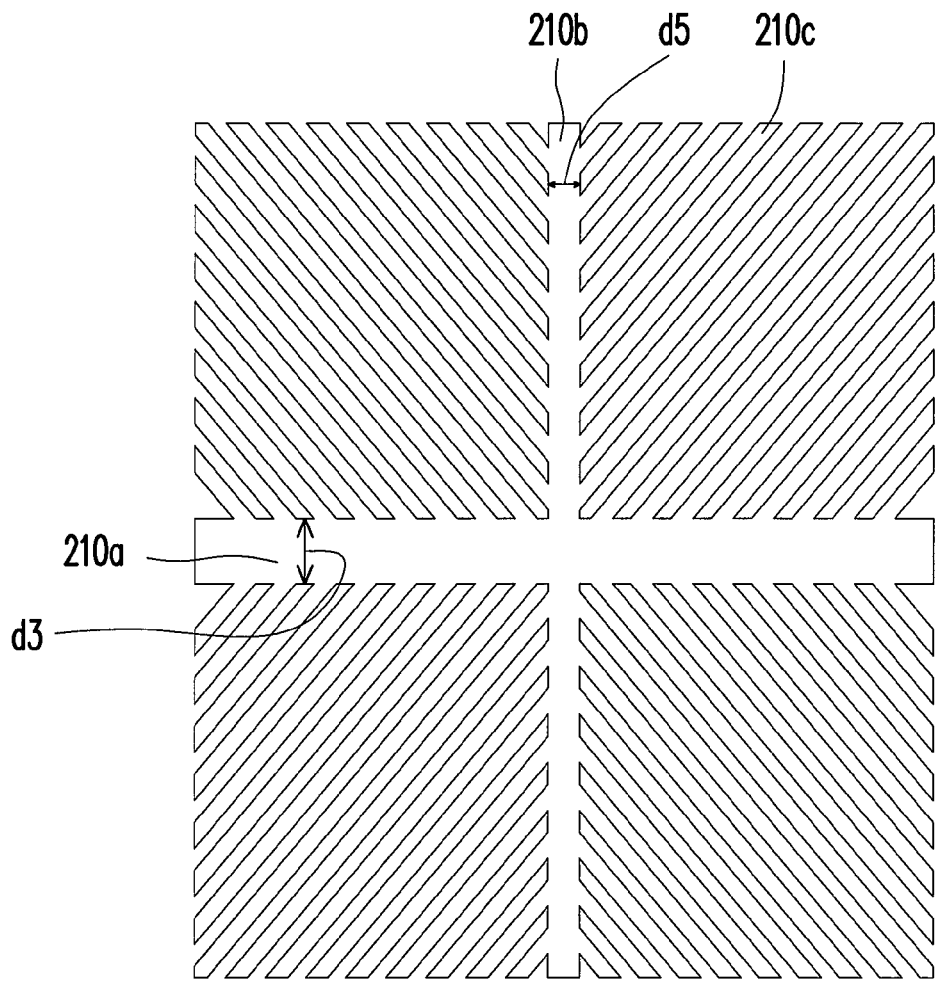
FIG. 2B is a schematic diagram showing the pixel electrode of the pixel structure of FIG. 2A.
Figure 3:
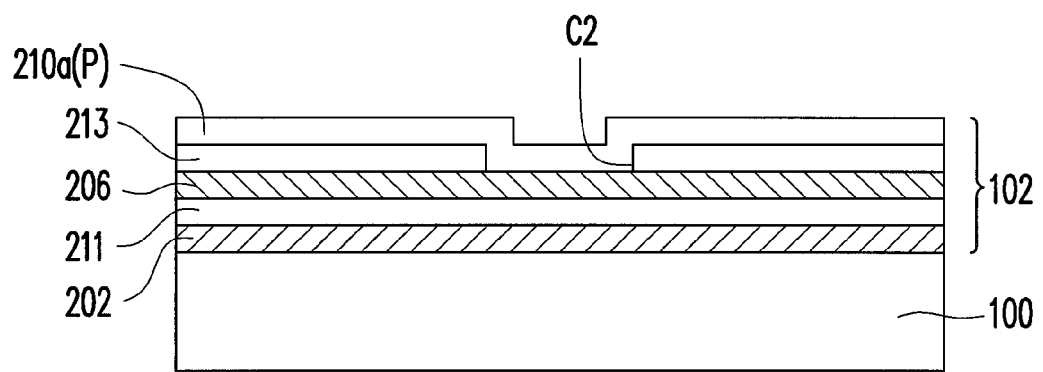
FIG. 3 is a schematic cross-sectional view taken along a line I-I' depicted in FIG. 2A.

Next, the pixel array layer 102 on the first substrate 100 is described in the following paragraphs. The pixel array layer 102 is comprised of a plurality of pixel structures. In the embodiment, each pixel structure is as shown in FIG. 2A, FIG. 2B is a schematic diagram showing the pixel electrode of the pixel structure of FIG. 2A, and FIG. 3 is a schematic cross-sectional view taken along a line I-I' depicted in FIG. 2A. Referring to FIG. 2A, FIG. 2B and FIG. 3, the pixel structure in the embodiment includes a scan line SL, a data line DL, an active device T, capacitor electrodes 202, 204, an upper electrode pattern 206 and a pixel electrode P.

The scan line SL and the data line DL are disposed on the first substrate 100. The scan line SL has an extending direction different from that of the data line DL. In the embodiment, a pixel region is defined between two neighboring scan lines SL and between two neighboring data lines DL. In addition, the scan line SL and the data line DL are disposed in different layers, and an insulating layer (not shown in FIG. 2A) is sandwiched therebetween. The scan line SL and the data line DL are used to transmit driving signals for the pixel structure.

The active device T is electrically connected to the scan line SL and the data line DL. Herein, the active device T is a thin film transistor comprising a gate G, a channel layer CH, a source S, and a drain D. The gate G is electrically connected to the scan line SL, and the source S is electrically connected to the data line DL. The channel layer CH is disposed above the gate G and under the source S and the drain D. In the embodiment, the active device T is a bottom gate thin film transistor for illustration, which is not limited in the present invention. According to another embodiment, the active device T is, for example, a top gate thin film transistor.

The capacitor electrodes 202, 204 are disposed on the first substrate 100. In the embodiment, the capacitor electrode 202 has an extending direction parallel to the scan line SL substantially, and the capacitor electrode 204 has an extending direction parallel to the data line DL substantially. Hence, the capacitor electrode 202 is also called a first direction extending part, and the capacitor electrode 204 is also called a second direction extending part. According to the embodiment, the capacitor electrodes 202, 204 and the scan line SL are formed simultaneously, and thus the capacitor electrodes 202, 204 and the scan line SL are in the same layer. In an embodiment, the capacitor electrodes 202, 204 in the pixel structures are electrically connected to a common voltage.

Herein, the first direction extending part (the capacitor electrode) 202 and the second direction extending part (the capacitor electrode) 204 are perpendicular to each other to form a cross-shaped structure. However, the present invention does not limit to the embodiment. According to another embodiment, the first direction extending part (the capacitor electrode) 202 and the second direction extending part (the capacitor electrode) 204 may form another structure. That is to say, the first direction extending part (the capacitor electrode) 202 crosses the second direction extending part (the capacitor electrode) 204, and an angle between the first direction extending part 202 and the second direction extending part 204 is larger than 0° and smaller than 180°. It is noted that the first direction extending part (the capacitor electrode) 202 and the second direction extending part (the capacitor electrode) 204 may also serve as shielding lines, and thereby the liquid crystal molecules tilting above the first direction extending part (the capacitor electrode) 202 and the second direction extending part (the capacitor electrode) 204 can be shielded and not be observed.

The upper electrode pattern 206 is disposed above the capacitor electrode 202, and more specifically, the upper electrode pattern 206 is disposed above the first direction extending part (the capacitor electrode) 202. In the embodiment, the upper electrode pattern 206 overlaps with the capacitor electrode 202 and an insulating layer 211 (shown in FIG. 3) is sandwiched therebetween, such that the upper electrode pattern 206 is electrically isolated from the capacitor electrode 202. According to the embodiment, the upper electrode pattern 206 and the data line DL are formed simultaneously, and thus the upper electrode pattern 206 and the data line DL are in the same layer.

The pixel electrode P is electrically connected to the active device T. In the embodiment, the pixel electrode P is electrically connected to the drain D of the active device T. More specifically, a contact window C1 is further disposed in an overlapping region between the pixel electrode P and the drain D of the active device T, so as to electrically connect the pixel electrode P and the drain D. In addition, the pixel electrode P covers the capacitor electrodes 202, 204 and the upper electrode pattern 206, and an insulating layer 213 (as shown in FIG. 3) is sandwiched between the pixel electrode P and the upper electrode pattern 206. Moreover, a contact window C2 is formed between the pixel electrode P and the upper electrode 206, so as to electrically connect the pixel electrode P and the upper electrode 206. In other word, the pixel electrode P and the upper electrode 206 have the same electric potential. Because the upper electrode patter 206 electrically couples with the capacitor electrode 202, the electric charges of the pixel electrode P can be stored therein, so as to form a storage capacitor of the pixel structure.

In particular, the pixel electrode P includes a first extending part 210a, a second extending part 210b and branches 210c. The first extending part 210a is disposed above the first direction extending part (capacitor electrode) 202. The second extending part 210b is disposed above the second direction extending part (capacitor electrode) 204, and the second extending part 210b has an extending direction different from that of the first extending part 210a. That is to say, the extending direction of the first extending part 210a accompanies with that of the first direction extending part (capacitor electrode) 202, and the extending direction of the second extending part 210b accompanies with that of the second direction extending part (capacitor electrode) 204. In the embodiment, the extending direction of the second extending part 210b is perpendicular to the extending direction of the first extending part 210a, but it is not limited in the present invention. In other words, the first extending part 210a crosses the second extending part 210b, and an angle between the first extending part 210a and the second extending part 210b is larger than 0° and smaller than 180°. The branches 210c extend to an edge of the pixel region (the edges of the scan line SL and the data line DL) from the first extending part 210a and the second extending part 210b. Since the extending direction of the second extending part 210b is perpendicular to the extending direction of the first extending part 210a, the branches 210c extend from the first extending part 210a and the second extending part 210b to the edge of the pixel region along four directions. According to the embodiment, the first extending part 210a and the second extending part 210b respectively form an acute angle with each of the branches 210c. The acute angle may be 45°, 40° or other suitable angle. Thereby, a plurality of domains are formed in the pixel structure.

It should be noted, the first direction extending part (capacitor electrode) 202 is not completely covered by the first extending part 210a of the pixel electrode P, and the second direction extending part (capacitor electrode) 204 is not completely covered by the second extending part 210b of the pixel electrode P. In other word, the branches 210c further extend above the first direction extending part (capacitor electrode) 202 and the second direction extending part (capacitor electrode) 204. In the embodiment, the width d3 of the first extending part 210a of the pixel electrode P and the width d5 of the second extending part 210b of the pixel electrode P are respectively smaller than the width d1 of the first direction extending part (capacitor electrode) 202 and the width d4 of the second direction extending part (capacitor electrode) 204, such that the branches 210c further extend above the first direction extending part (capacitor electrode) 202 and the second direction extending part (capacitor electrode) 204.

According to another embodiment, the width d3 of the first extending part 210a of the pixel electrode P is smaller than the width d2 of the upper electrode pattern 206, such that a portion of the branches 210c extend above the upper electrode pattern 206. In this embodiment, the upper electrode pattern 206 is not completely covered by the first extending part 210a of the pixel electrode P.

In the embodiment of FIG. 2A and FIG. 2B, the width d3 of the first extending part 210a of the pixel electrode P and the width d5 of the second extending part 210b of the pixel electrode P are respectively smaller than the width d1 of the first direction extending part (capacitor electrode) 202 and the width d4 of the second direction extending part (capacitor electrode) 204, even the width d3 of the first extending part 210a of the pixel electrode P is smaller than the width d2 of the upper electrode pattern 206. However, the present invention does not limit to the embodiment. According to another embodiment, only the width d3 of the first extending part 210a of the pixel electrode P is smaller than the width d1 of the first direction extending part (capacitor electrode) 202, such that a portion of the branches 210c extend above the first direction extending part (capacitor electrode) 202, even the width d3 of the first extending part 210a of the pixel electrode P is smaller than the width d2 of the upper electrode pattern 206, such that a portion of the branches 210c extend above the upper electrode pattern 206. According to another embodiment yet, only the width d5 of the second extending part 210b of the pixel electrode P is smaller than the width d4 of the second direction extending part (capacitor electrode) 204, such that a portion of the branches 210c extend above the second direction extending part (capacitor electrode) 204.

In the above mentioned embodiments, the width d3 of the first extending part 210a of the pixel electrode P and/or the width d5 of the second extending part 210b of the pixel electrode P are/is smaller than the width d1 of the first direction extending part (capacitor electrode) 202 and/or the width d4 of the second direction extending part (capacitor electrode) 204, even the width d3 of the first extending part 210a of the pixel electrode P is smaller than the width d2 of the upper electrode pattern 206, such that the first direction extending part (capacitor electrode) 202 and/or the second direction extending part (capacitor electrode) 204 are/is not completely covered by the first extending part 210a of the pixel electrode P and/or the second extending part 210b of the pixel electrode P. Since the electric field distribution between the capacitor electrode(s) and the pixel electrode/upper electrode pattern is changed, the liquid crystal molecule tilting on the first direction extending part (capacitor electrode) 202 and/or the second direction extending part (capacitor electrode) 204 is changed. Thereby, when the pixel structure is used in a display panel, the problem of disclination line displayed at the capacitor electrode(s) of the convention PSA display panel is resolved.

In the above mentioned embodiments, the width d3 of the first extending part 210a of the pixel electrode P and/or the width d5 of the second extending part 210b of the pixel electrode P are/is smaller than the width d1 of the first direction extending part (capacitor electrode) 202 and/or the width d4 of the second direction extending part (capacitor electrode) 204, even the width d3 of the first extending part 210a of the pixel electrode P is smaller than the width d2 of the upper electrode pattern 206, such that the first direction extending part (capacitor electrode) 202 and/or the second direction extending part (capacitor electrode) 204 are/is not completely covered by the first extending part 210a of the pixel electrode P and/or the second extending part 210b of the pixel electrode P. However, the present invention does not limit to the above embodiments. According to another embodiment, the first extending part 210a and/or the second extending part 210b of the pixel electrode P may also be designed to another structure, so as to achieve that the first direction extending part (capacitor electrode) 202 and/or the second direction extending part (capacitor electrode) 204, even the upper electrode pattern 206, are not completely covered by the first extending part 210a and/or the second extending part 210b of the pixel electrode P.

Figure 4A:
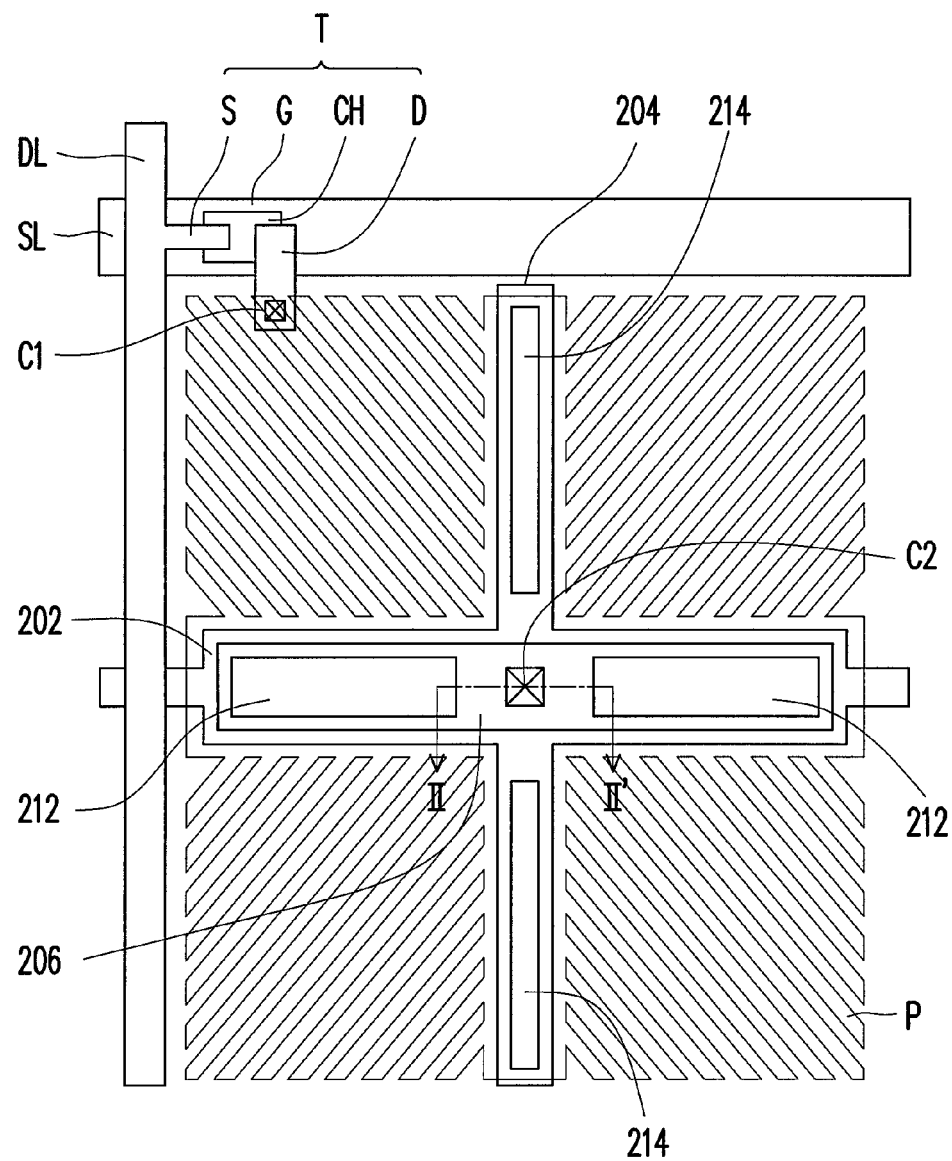
FIG. 4A is a schematic top view of a pixel structure according to an embodiment of the present invention.
Figure 4B:
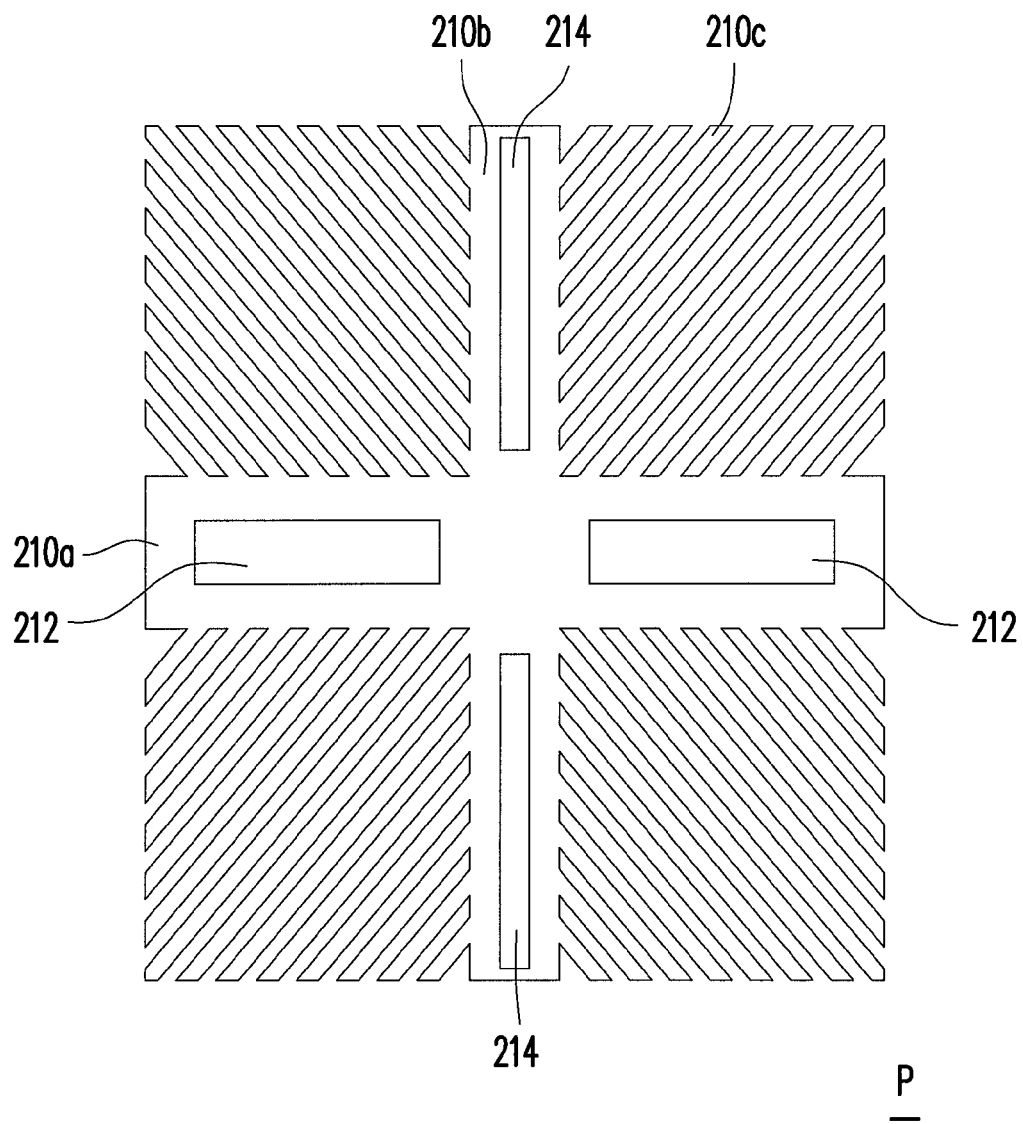
FIG. 4B is a schematic diagram showing the pixel electrode of the pixel structure of FIG. 4A.
Figure 5:
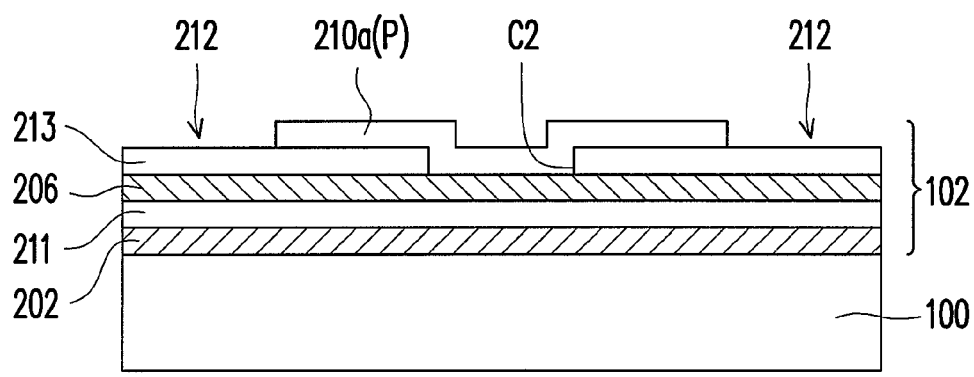
FIG. 5 is a schematic cross-sectional view taken along a line I-I' depicted in FIG. 4A.

FIG. 4A is a schematic top view of a pixel structure according to an embodiment of the present invention, FIG. 4B is a schematic diagram showing the pixel electrode of the pixel structure of FIG. 4A, and FIG. 5 is a schematic cross-sectional view taken along a line II-II' depicted in FIG. 4A. The embodiment shown in FIG. 4A and FIG. 4B is similar to the embodiment shown in FIG. 2A and FIG. 2B so that components identical to those of FIG. 2A and FIG. 2B will be denoted with the same numerals in FIG. 4A and FIG. 4B and not repeated herein. The difference between the embodiment of FIG. 4A and FIG. 4B and the embodiment of FIG. 2A and FIG. 2B lies in the first extending part 210a of the pixel electrode P has at least one first opening 212 and the second extending part 210b of the pixel electrode P has at least one second opening 214. The first opening 212 exposes the upper electrode pattern 206 (as shown in FIG. 5), and more specifically, the first opening 212 exposes the insulating layer 213 on the upper electrode pattern 206. The second opening 214 exposes the second direction extending part (capacitor electrode) 204, and more specifically, the second opening 214 exposes the insulating layer 213 on the second direction extending part (capacitor electrode) 204. It should be noted that the number, the shape and the arrangement of the first opening 212 and the second opening 214 are not limited herein. The first opening 212 and the second opening 214 shown in the drawings are only used to explain the embodiment such that people skilled in the art can understand and further implement the present invention. However, the present invention is not limited to this embodiment. Actually, the number of the first opening 212 and the number of the second opening 214 may respectively be one, two, three or more. The shape of the first opening 212 and the shape of the second opening may respectively be rectangular, square, circular or polygonal. The arrangement of the first opening 212 and the arrangement of the second opening may respectively be a symmetrical arrangement, an anti-symmetrical arrangement or a side-by-side arrangement.

In the embodiment of FIG. 4A and FIG. 4B, the first opening 212 is formed in the first extending part 210a of the pixel electrode P and the second opening 214 is formed in the second extending part 210b of the pixel electrode P. However, the present invention is not limited herein. In another embodiment, only the first opening 212 is formed in the first extending part 210a of the pixel electrode P. According to another embodiment yet, only the second opening 214 is formed in the second extending part 210b of the pixel electrode P.

The first opening 212 is formed in the first extending part 210a of the pixel electrode P and/or the second opening 214 is formed in the second extending part 210b of the pixel electrode P. Therefore, the first direction extending part and/or the second direction extending part (capacitor electrode) are/is not completely by the first extending part and/or the second extending part of the pixel electrode. Since the electric field distribution between the capacitor electrode(s) and the pixel electrode/upper electrode pattern is changed, the liquid crystal molecule tilting on the first direction extending part (capacitor electrode) 202 and/or the second direction extending part (capacitor electrode) 204 is changed. Thereby, when the pixel structure is used in a display panel, the problem of disclination line displayed at the capacitor electrode(s) of the convention PSA display panel is resolved.

In addition, according to another embodiment, the embodiment of FIG. 2A is combined with the embodiment of FIG. 4A. That is, the width d3 of the first extending part 210a of the pixel electrode P and/or the width d5 of the second extending part 210b of the pixel electrode P are/is smaller than the width d1 of the first direction extending part (capacitor electrode) 202 and/or the width d4 of the second direction extending part (capacitor electrode) 204, even the width d3 of the first extending part 210a of the pixel electrode P is smaller than the width d2 of the upper electrode pattern 206, such that the first direction extending part (capacitor electrode) 202 and/or the second direction extending part (capacitor electrode) 204 are/is not completely covered by the first extending part 210a of the pixel electrode P and/or the second extending part 210b of the pixel electrode P. Simultaneously, the first opening 212 is formed in the first extending part 210a of the pixel electrode P and/or the second opening 214 is formed in the second extending part 210b of the pixel electrode P.

Figure 6A:
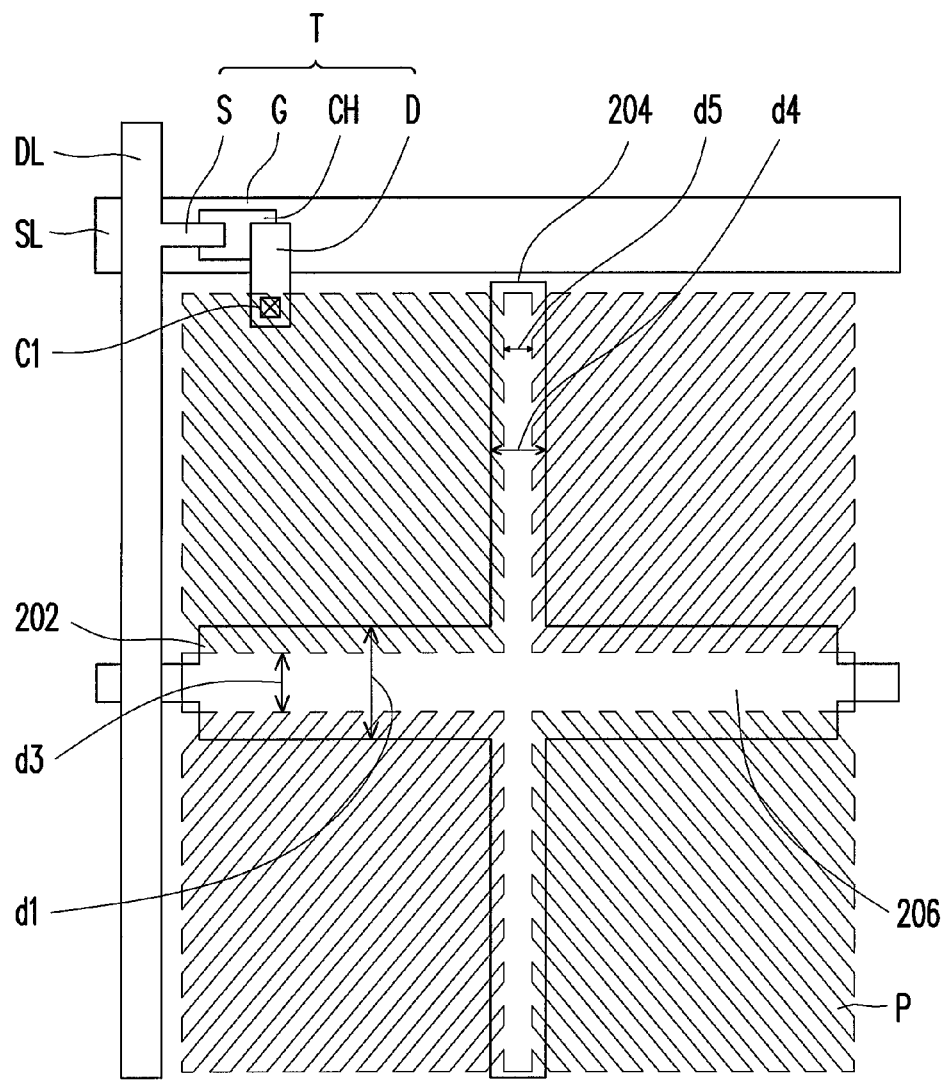
FIG. 6A is a schematic top view of a pixel structure according to an embodiment of the present invention.
Figure 6B:
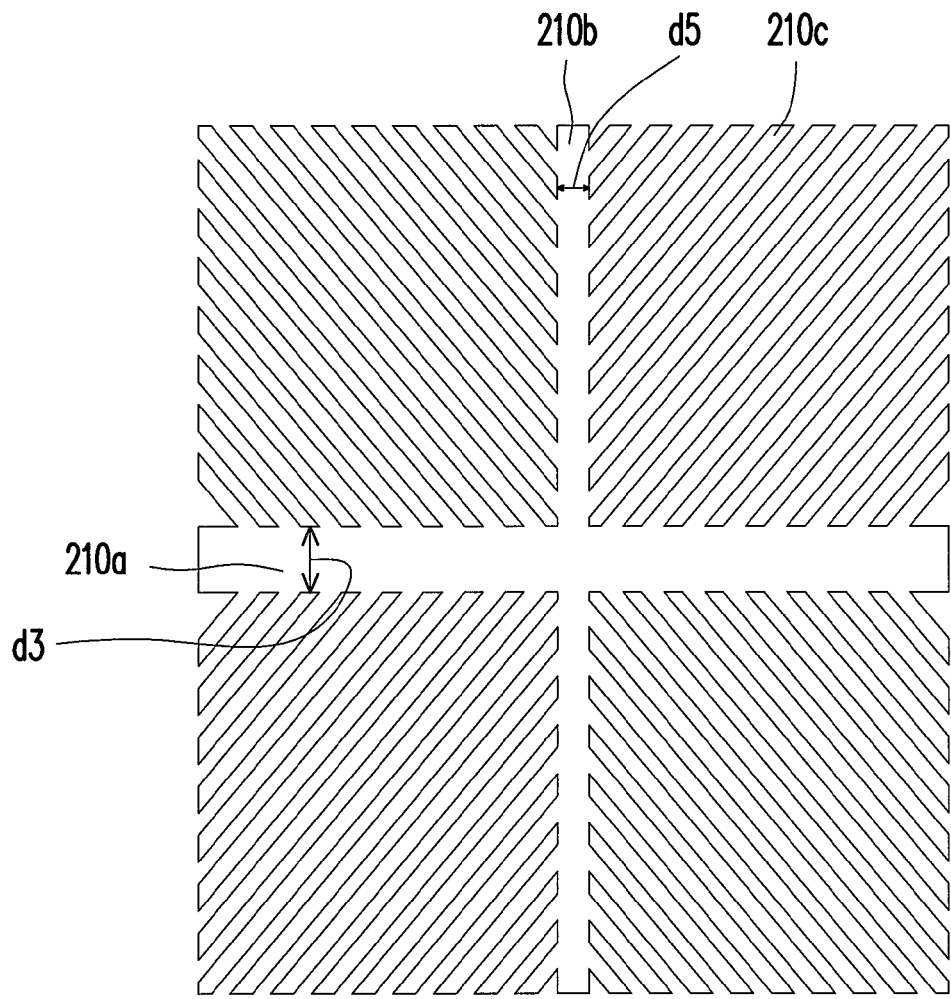
FIG. 6B is a schematic diagram showing the pixel electrode of the pixel structure of FIG. 6A.

In the pixel structures of the above mentioned embodiments, the storage capacitor of the pixel structure is formed between the first direction extending part (capacitor electrode) 202 and the upper electrode pattern 206 and between the second direction extending part (capacitor electrode) 204 and the second extending part 210b of the pixel electrode P. However, the invention is not limited thereto. FIG. 6A is a schematic top view of a pixel structure according to an embodiment of the present invention, FIG. 6B is a schematic diagram showing the pixel electrode of the pixel structure of FIG. 6A. The embodiment shown in FIG. 6A and FIG. 6B is similar to the embodiment shown in FIG. 2A and FIG. 2B so that components identical to those of FIG. 2A and FIG. 2B will be denoted with the same numerals in FIG. 6A and FIG. 6B and not repeated herein. The difference between the embodiment of FIG. 6A and FIG. 6B and the embodiment of FIG. 2A and FIG. 2B lies in the upper electrode pattern is not disposed above the first direction extending part (capacitor electrode) 202. Hence, the storage capacitor of the pixel structure is formed between the first direction extending part (capacitor electrode) 202 and the first extending part 210a of the pixel electrode P and between the second direction extending part (capacitor electrode) 204 and the second extending part 210b of the pixel electrode P. In particular, the width d3 of the first extending part 210a of the pixel electrode P and the width d5 of the second extending part 210b of the pixel electrode P are substantially smaller than the width d1 of the first direction extending part (capacitor electrode) 202 and the width d4 of the second direction extending part (capacitor electrode) 204, respectively. Similarly, according to another embodiment, only the width d3 of the first extending part 210a of the pixel electrode P is smaller than the width d1 of the first direction extending part (capacitor electrode) 202, such that a portion of the branches 210c extend above the first direction extending part (capacitor electrode) 202. According to another embodiment yet, only the width d5 of the second extending part 210b of the pixel electrode P is smaller than the width d4 of the second direction extending part (capacitor electrode) 204, such that a portion of the branches 210c extend above the second direction extending part (capacitor electrode) 204.

Figure 7A:
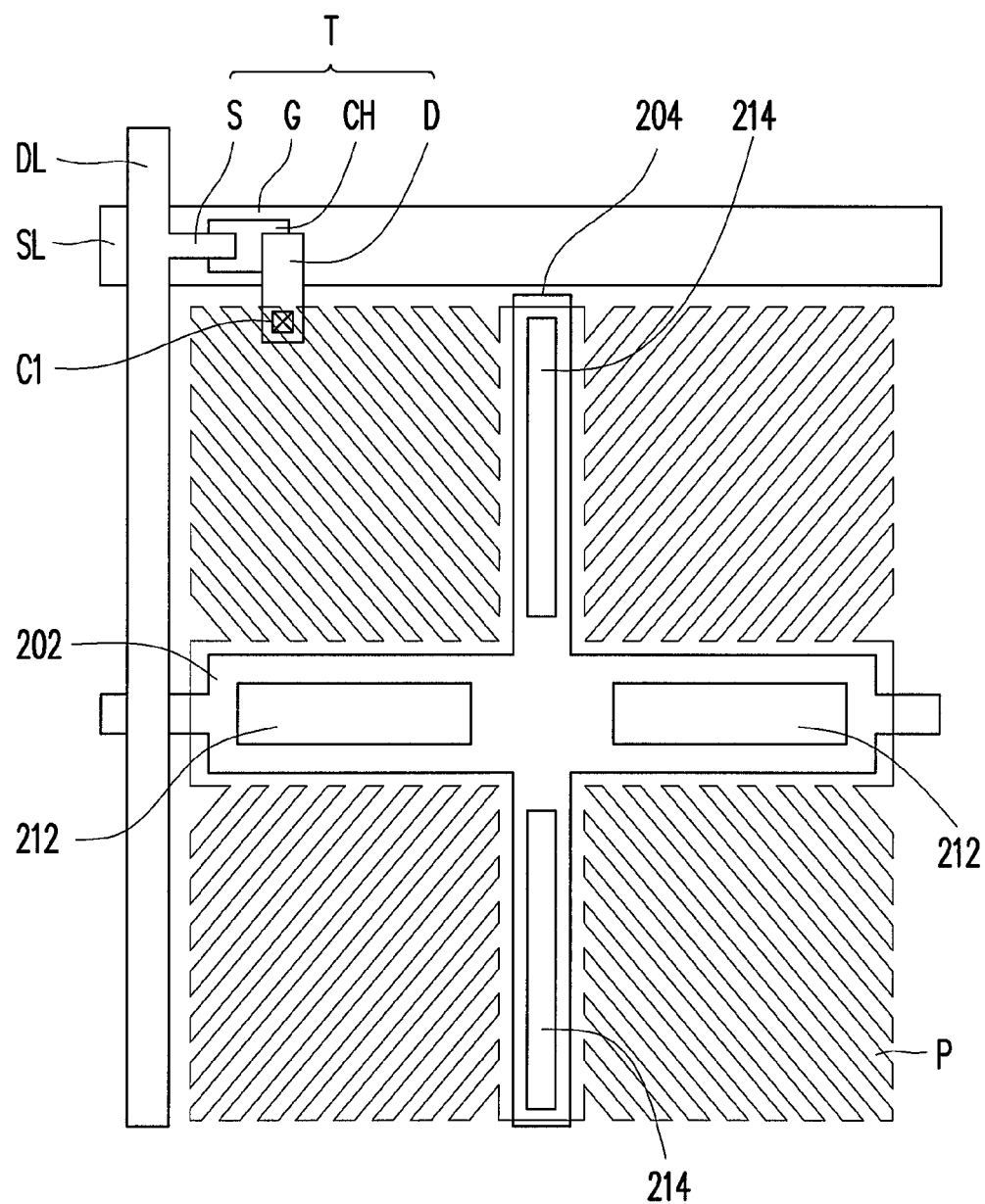
FIG. 7A is a schematic top view of a pixel structure according to an embodiment of the present invention.
Figure 7B:
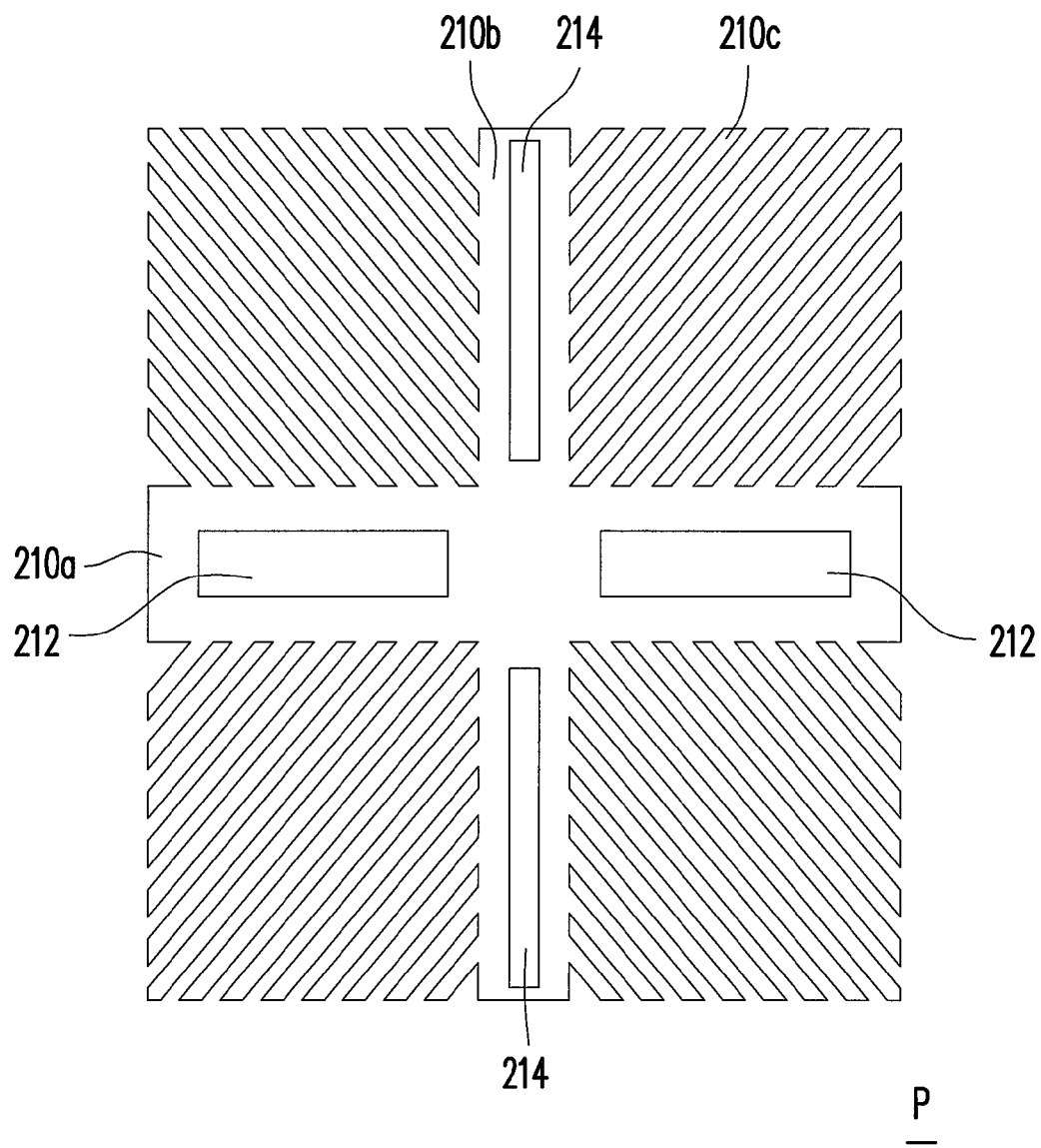
FIG. 7B is a schematic diagram showing the pixel electrode of the pixel structure of FIG. 7A.

FIG. 7A is a schematic top view of a pixel structure according to an embodiment of the present invention, FIG. 7B is a schematic diagram showing the pixel electrode of the pixel structure of FIG. 7A. The embodiment shown in FIG. 7A and FIG. 7B is similar to the embodiment shown in FIG. 4A and FIG. 4B so that components identical to those of FIG. 4A and FIG. 4B will be denoted with the same numerals in FIG. 7A and FIG. 7B and not repeated herein. The difference between the embodiment of FIG. 7A and FIG. 7B and the embodiment of FIG. 4A and FIG. 4B lies in the upper electrode pattern is not disposed above the first direction extending part (capacitor electrode) 202. Hence, the storage capacitor of the pixel structure is formed between the first direction extending part (capacitor electrode) 202 and the first extending part 210a of the pixel electrode P and between the second direction extending part (capacitor electrode) 204 and the second extending part 210b of the pixel electrode P. In particular, the first opening 212 is formed in the first extending part 210a of the pixel electrode P and the second opening 214 is formed in the second extending part 210b of the pixel electrode P. However, the present invention is not limited herein. In another embodiment, only the first opening 212 is formed in the first extending part 210a of the pixel electrode P. According to another embodiment yet, only the second opening 214 is formed in the second extending part 210b of the pixel electrode P.

Similarly, according to another embodiment, the embodiment of FIG. 6A is combined with the embodiment of FIG. 7A. That is, in the configuration of no upper electrode pattern is disposed above the first direction extending part (capacitor electrode) 202, the width d3 of the first extending part 210a of the pixel electrode P and/or the width d5 of the second extending part 210b of the pixel electrode P are/is smaller than the width d1 of the first direction extending part (capacitor electrode) 202 and/or the width d4 of the second direction extending part (capacitor electrode) 204, such that the first direction extending part (capacitor electrode) 202 and/or the second direction extending part (capacitor electrode) 204 are/is not completely covered by the first extending part 210a of the pixel electrode P and/or the second extending part 210b of the pixel electrode P. Simultaneously, the first opening 212 is formed in the first extending part 210a of the pixel electrode P and/or the second opening 214 is formed in the second extending part 210b of the pixel electrode P.

Figure 8A:
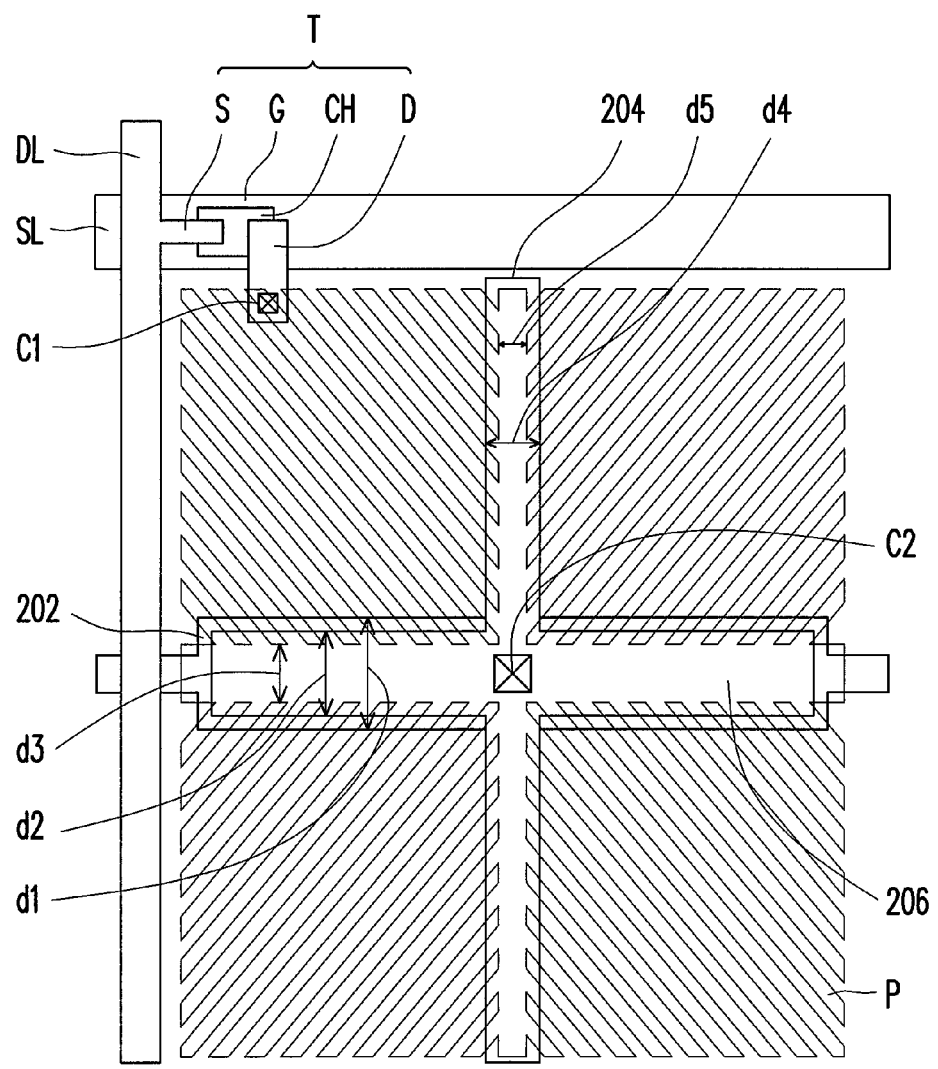
FIG. 8A is a schematic top view of a pixel structure according to an embodiment of the present invention.
Figure 8B:
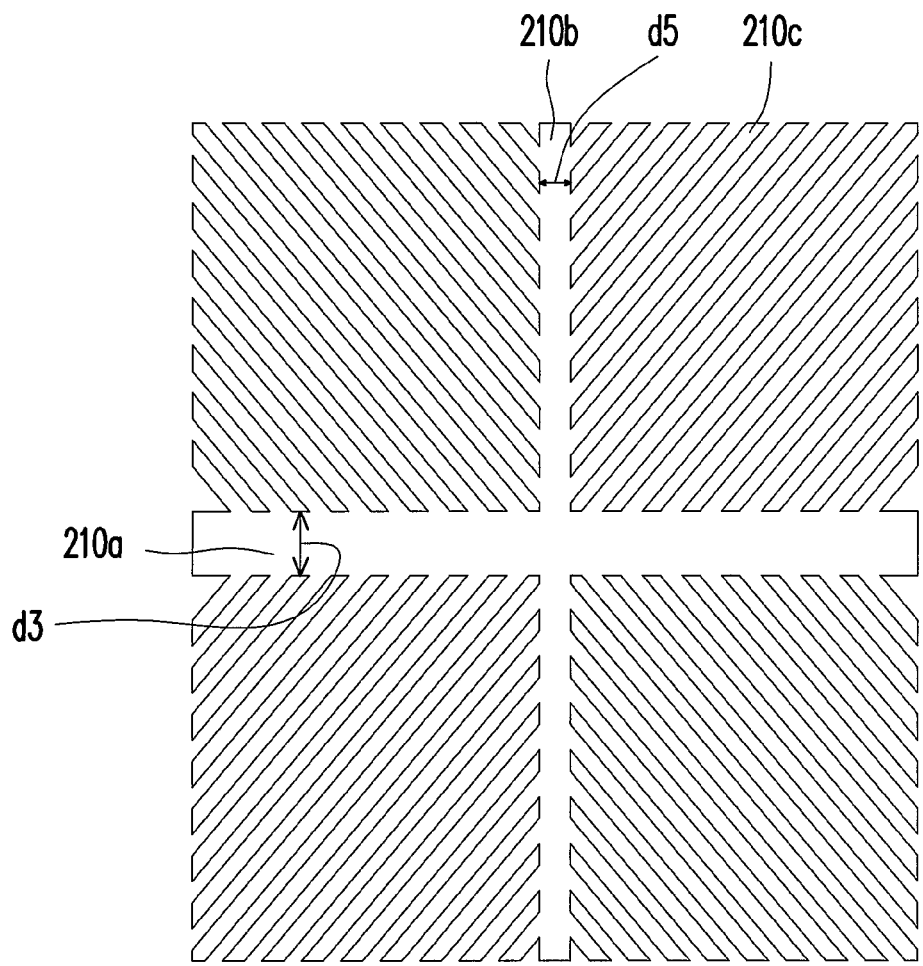
FIG. 8B is a schematic diagram showing the pixel electrode of the pixel structure of FIG. 8A.

FIG. 8A is a schematic top view of a pixel structure according to an embodiment of the present invention, FIG. 8B is a schematic diagram showing the pixel electrode of the pixel structure of FIG. 8A. The embodiment shown in FIG. 8A and FIG. 8B is similar to the embodiment shown in FIG. 2A and FIG. 2B so that components identical to those of FIG. 2A and FIG. 2B will be denoted with the same numerals in FIG. 8A and FIG. 8B and not repeated herein. The difference between the embodiment of FIG. 8A and FIG. 8B and the embodiment of FIG. 2A and FIG. 2B lies in the second direction extending part (capacitor electrode) 206 and the upper electrode pattern 206 are in the same layer, and thus the second direction extending part (capacitor electrode) 206 and the upper electrode pattern 206 form a cross-shaped structure. Similarly, the present invention is not limited herein. According to another embodiment, the second direction extending part (the capacitor electrode) 204 and the upper electrode pattern 206 may form another structure. That is to say, the second direction extending part (the capacitor electrode) 204 crosses the upper electrode pattern 206, and an angle between the second direction extending part 204 and the upper electrode pattern 206 is larger than 0° and smaller than 180°. The storage capacitor of the pixel structure is formed between the first direction extending part (capacitor electrode) 202 and the upper electrode pattern 206 and between the second direction extending part (capacitor electrode) 204 and the second extending part 210b of the pixel electrode P. In particular, the width d3 of the first extending part 210a of the pixel electrode P and the width d5 of the second extending part 210b of the pixel electrode P are substantially smaller than the width d1 of the first direction extending part (capacitor electrode) 202 and the width d4 of the second direction extending part (capacitor electrode) 204, respectively. Similarly, according to another embodiment, only the width d3 of the first extending part 210a of the pixel electrode P is smaller than the width d1 of the first direction extending part (capacitor electrode) 202, such that a portion of the branches 210c extend above the first direction extending part (capacitor electrode) 202. According to another embodiment yet, only the width d5 of the second extending part 210b of the pixel electrode P is smaller than the width d4 of the second direction extending part (capacitor electrode) 204, such that a portion of the branches 210c extend above the second direction extending part (capacitor electrode) 204.

Figure 9A:
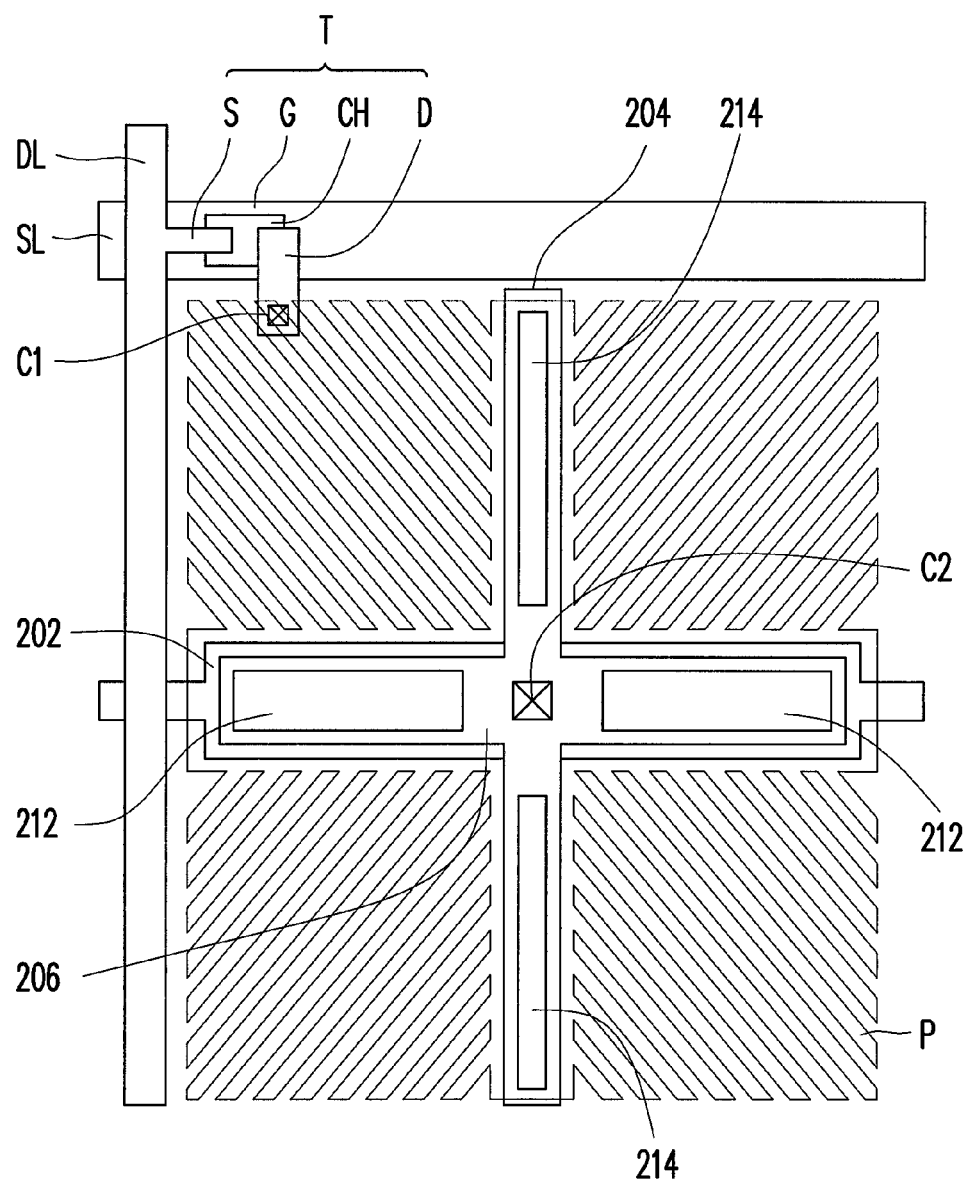
FIG. 9A is a schematic top view of a pixel structure according to an embodiment of the present invention.
Figure 9B:
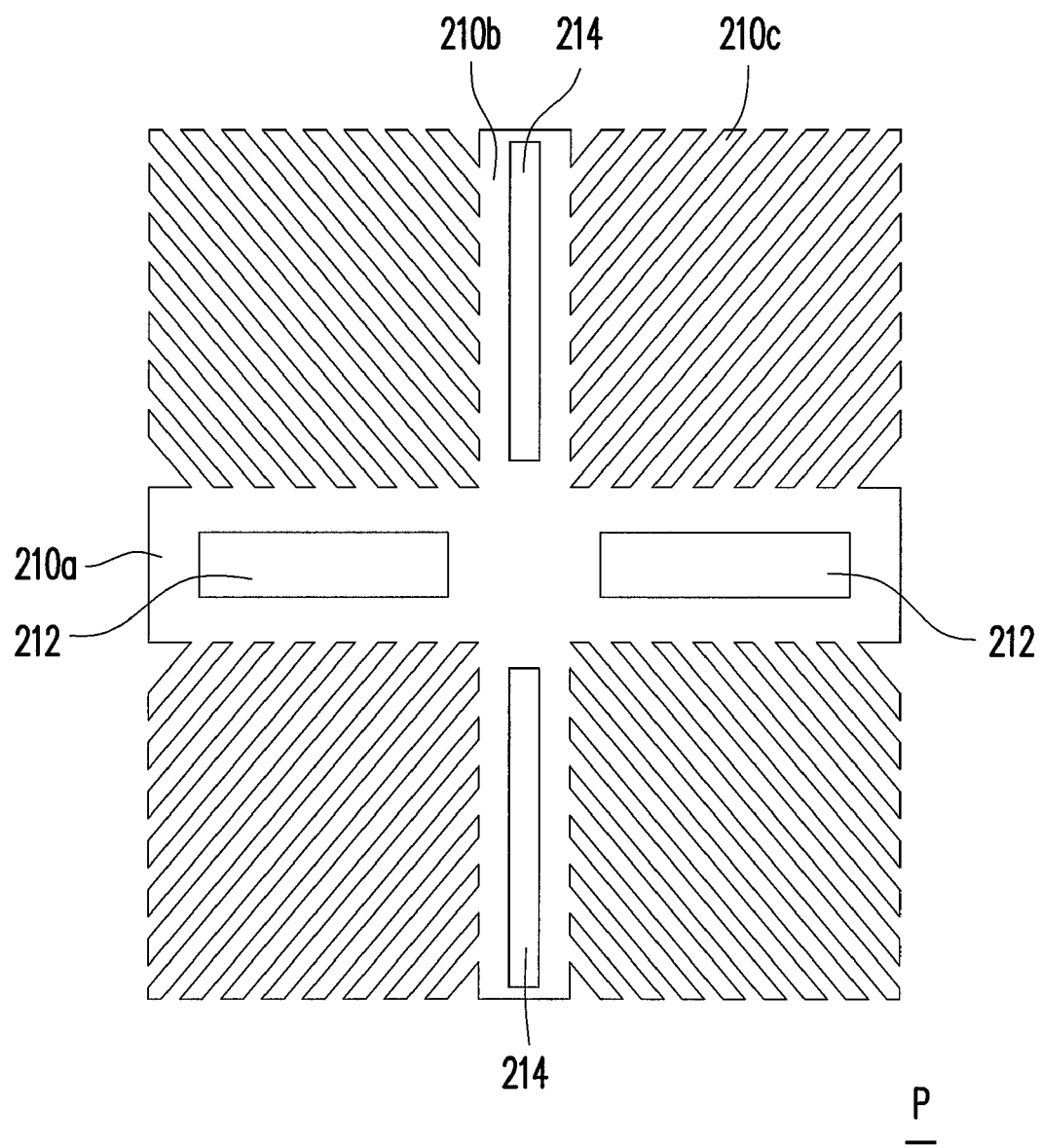
FIG. 9B is a schematic diagram showing the pixel electrode of the pixel structure of FIG. 9A.

FIG. 9A is a schematic top view of a pixel structure according to an embodiment of the present invention, FIG. 9B is a schematic diagram showing the pixel electrode of the pixel structure of FIG. 9A. The embodiment shown in FIG. 9A and FIG. 9B is similar to the embodiment shown in FIG. 4A and FIG. 4B so that components identical to those of FIG. 4A and FIG. 4B will be denoted with the same numerals in FIG. 9A and FIG. 9B and not repeated herein. The difference between the embodiment of FIG. 9A and FIG. 9B and the embodiment of FIG. 4A and FIG. 4B lies in the second direction extending part (capacitor electrode) 204 and the upper electrode pattern 206 are in the same layer, and thus the second direction extending part (capacitor electrode) 204 and the upper electrode pattern 206 form a cross-shaped structure. Similarly, the present invention is not limited herein. According to another embodiment, the second direction extending part (the capacitor electrode) 204 and the upper electrode pattern 206 may form another structure. That is to say, the second direction extending part (the capacitor electrode) 204 crosses the upper electrode pattern 206, and an angle between the second direction extending part 204 and the upper electrode pattern 206 is larger than 0° and smaller than 180°. In particular, the first opening 212 is formed in the first extending part 210a of the pixel electrode P and the second opening 214 is formed in the second extending part 210b of the pixel electrode P. However, the present invention is limited herein. In another embodiment, only the first opening 212 is formed in the first extending part 210a of the pixel electrode P. According to another embodiment yet, only the second opening 214 is formed in the second extending part 210b of the pixel electrode P.

Similarly, according to another embodiment, the embodiment of FIG. 8A is combined with the embodiment of FIG. 9A. That is, in the configuration of the second direction extending part (capacitor electrode) 204 and the upper electrode pattern 206 are in the same layer, the width d3 of the first extending part 210a of the pixel electrode P and/or the width d5 of the second extending part 210b of the pixel electrode P are/is smaller than the width d1 of the first direction extending part (capacitor electrode) 202 and/or the width d4 of the second direction extending part (capacitor electrode) 204, even the width d3 of the first extending part 210a of the pixel electrode P is smaller than the width d2 of the upper electrode pattern 206, such that the first direction extending part (capacitor electrode) 202 and/or the second direction extending part (capacitor electrode) 204 are/is not completely covered by the first extending part 210*a* of the pixel electrode P and/or the second extending part 210*b* of the pixel electrode P. Simultaneously, the first opening 212 is formed in the first extending part 210*a* of the pixel electrode P and/or the second opening 214 is formed in the second extending part 210*b* of the pixel electrode P.

According to the aforementioned, since the pixel electrode electrically coupling with the capacitor electrode has a width smaller than that of the capacitor electrode or/and the pixel electrode electrically coupling with the capacitor electrode has an opening therein, the capacitor electrode is not completely covered by the pixel electrode. Therefore, the liquid crystal molecule tilting on the capacitor electrode is changed, so that the disclination line generated at the capacitor electrode is avoided.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A pixel structure, comprising:
    a substrate having a pixel area;
    a scan line and a data line, disposed on the substrate;
    an active device, electrically connected to the scan line and the data line;
    a capacitor electrode, disposed on the substrate; and
    a pixel electrode, disposed in the pixel region and electrically connected to the active device, the pixel electrode comprising:
        a first extending part, disposed above the capacitor electrode and electrically coupling with the capacitor electrode, wherein the capacitor electrode is not completely covered by the first extending part;
        a second extending part, having an extending direction different from that of the first extending part; and
        a plurality of branches, extending from the first extending part and the second extending part to an edge of the pixel region,
    wherein the capacitor electrode comprises:
        a first direction extending part, disposed under the first extending part of the pixel electrode, wherein the first direction extending part of the capacitor electrode is not completely covered by the first extending part of the pixel electrode; and
        a second direction extending part, disposed under the second extending part of the pixel electrode, wherein the second direction extending part of the capacitor electrode is not completely covered by the second extending part of the pixel electrode.

2. The pixel structure of claim 1, wherein the first extending part of the pixel electrode has a width smaller than that of the capacitor electrode.

3. The pixel structure of claim 2, wherein the branches connecting with the first extending part extend above the capacitor electrode.

4. The pixel structure of claim 1, wherein the first extending part has at least one opening exposing the capacitor electrode.

5. The pixel structure as claimed in claim 1, wherein the capacitor electrode has an extending direction parallel to that of the scan line or the data line.

6. The pixel structure as claimed in claim 1, further comprising an upper electrode pattern disposed above the capacitor electrode, wherein the upper electrode pattern is electrically connected to the pixel electrode and electrically couples with the capacitor electrode, and the upper electrode pattern is not completely covered by the first extending part of the pixel electrode.

7. The pixel structure of claim 6, wherein the first extending part of the pixel electrode has a width smaller than that of the upper electrode pattern.

8. The pixel structure of claim 7, wherein the branches connecting with the first extending part extend above the upper electrode pattern.

9. The pixel structure of claim 6, wherein the first extending part has at least one opening exposing the upper electrode pattern.

10. The pixel structure of claim 1, wherein the first extending part of the pixel electrode has a width smaller than that of the first direction extending part of the capacitor electrode, and the second extending part of the pixel electrode has a width smaller than that of the second direction extending part of the capacitor electrode.

11. The pixel structure of claim 10, wherein the branches connecting with the first extending part extend above the first direction extending part of the capacitor electrode, and the branches connecting with the second extending part extend above the second direction extending part of the capacitor electrode.

12. The pixel structure of claim 1, wherein the first extending part of the pixel electrode has at least one first opening exposing the first direction extending part of the capacitor electrode, and the second extending part of the pixel electrode has at least one second opening exposing the second direction extending part of the capacitor electrode.

13. The pixel structure as claimed in claim 1, further comprising an upper electrode pattern disposed above the first direction extending part of the capacitor electrode, wherein the upper electrode pattern is electrically connected to the pixel electrode and electrically couples with the first direction extending part of the capacitor electrode, and the upper electrode pattern is not completely covered by the first extending part of the pixel electrode.

14. The pixel structure of claim 13, wherein the first extending part of the pixel electrode has a width smaller than that of the upper electrode pattern.

15. The pixel structure of claim 14, wherein the branches connecting with the first extending part extend above the upper electrode pattern.

16. The pixel structure of claim 13, wherein the first extending part has at least one opening exposing the upper electrode pattern.

17. The pixel structure of claim 1, wherein the branches extend from the first extending part and the second extending part to the edge of the pixel region along four directions.

18. The pixel structure of claim 1, wherein the first extending part and the second extending part respectively form an acute angle with each of the branches of the pixel electrode.

19. A display panel, comprising:
    a first substrate, having a plurality of pixel structures thereon, wherein each pixel structure is as claimed in claim 1;
    a second substrate disposed opposite to the first substrate; and
    a display medium, sandwiched between the first substrate and the second substrate.

* * * * *